United States Patent [19]

Bennett et al.

[11] Patent Number: 4,838,491

[45] Date of Patent: Jun. 13, 1989

[54] COUPLING

[75] Inventors: Peter C. Bennett, Churt Surrey, England; Rodney J. Clarke, Chichester, England

[73] Assignee: Imperial Chemical Industries PLC, England

[21] Appl. No.: 251,400

[22] Filed: Sep. 30, 1988

Related U.S. Application Data

[63] Continuation of Ser. No. 515,266, Jul. 19, 1983.

[30] Foreign Application Priority Data

Aug. 18, 1982 [GB] United Kingdom ................. 8223723

[51] Int. Cl.[4] .............................................. B05B 5/00
[52] U.S. Cl. .................................... 239/690; 285/187; 285/351; 285/355
[58] Field of Search ................ 239/690; 285/187, 351, 285/355, 423

[56] References Cited

U.S. PATENT DOCUMENTS

| 323,834 | 8/1885 | Turner | 285/187 |
|---|---|---|---|
| 341,713 | 5/1886 | Young | 285/351 |
| 714,476 | 11/1902 | Grubbs | 285/351 |
| 1,474,375 | 11/1923 | Moore | 285/351 |
| 3,499,670 | 3/1970 | De Woody | 285/355 |
| 3,695,642 | 10/1972 | De Woody | 285/355 |
| 4,192,533 | 3/1980 | Blose | 285/355 |
| 4,398,671 | 8/1983 | Coffee | 239/690 |

Primary Examiner—Andres Kashnikow
Assistant Examiner—Michael J. Forman
Attorney, Agent, or Firm—Cushman, Darby & Cushman

[57] ABSTRACT

A coupling between parts subject to differential expansion and contraction comprising first and second sealing abutments and an intervening constraint on relative movement whereby differential movements provide a self-compensating tightening and loosening of the sealing abutments. The coupling is especially useful for joining tubular parts such as caps or spray nozzles in containers for agricultural chemicals.

8 Claims, 2 Drawing Sheets

COUPLING

This is a continuation of application Ser. No. 06/515,266, filed July 19, 1983.

This invention relates to couplings, and in particular to couplings formed between two tubular plastics elements.

A problem which arises in forming couplings between plastics elements, in particular where the plastics elements are formed of plastics of two different types, is that of differential expansion. When a threaded joint, eg the neck of a container, is screwed down against a seal, eg in a cap, initially a good fluid tight joint may be formed. Subsequently however the joint is likely in use to undergo dimensional changes. If the cap expands more than the neck of the bottle, the cap sidewall will expand more than the neck sidewall, tending to lift the neck of the bottle off the seal. With aqueous liquids this is generally not too serious, but certain organic liquids require a very tight seal to prevent leaking. Differential expansion and contraction may be caused by swelling of the plastics materials by liquids in contact with them, particularly organic solvents. Such problems can occur with composite containers, such as those designed for the electrostatic spraying of agricultural chemicals, and are of especial concern in this context since these chemicals are frequently toxic creating a hazard for operators and the environment if leakage occurs. Generally problems are greatest when the two parts of the joint are made of different materials, though they can also occur when both parts of the joint are of the same material.

Differential expansion and contraction may also be caused by temperature changes.

We have now devised a coupling which overcomes at least in part the problem outlined above.

The present invention provides a coupling between parts subject in use to differential expansion or contraction comprising:

a first tubular part;

a second tubular part, the first and second parts being sleeved one inside the other to form a junction between the parts;

a first sealing contact between the first and second parts, a second sealing contact between the first and second parts, the first and second contacts being spaced in an axial direction in which the first and second parts are relatively movable to effect separation thereof; and constraining means for constraining relative movement between the first and second parts, the constraining means including opposed substantially radial shoulders formed on respective parts, each said radial shoulder having a side face disposed in a plane which is substantially perpendicular to an axis of said first and second parts, engagement between said side faces of said shoulders constraining relative movement between the first and second parts, said constraining means being defined at a first location between the first and second contacts so that upon a differential expansion or contraction of the first and second parts, relative movement between the first and second parts in an axial direction is constrained at said first location while a relative movement between the first and second parts at other locations between said first location and the first and second sealing contacts causes one of the sealing contacts to tighten and the other sealing contact to loosen, and vice versa.

Preferably the parts are tubular elements sleeved one inside the other to form a junction between the elements and the sealing contacts comprise a shoulder on each element abutting the end of the other tubular element.

Preferably also the mating surfaces of the junction are threaded and the constraint against relative movement is provided by opposed substantially radial shoulders in the thread profiles which are otherwise shaped with sufficient play to permit a degree of relative movement.

This reduces the possibility of relative movement of the tubes being taken up by slippage between the thread faces.

Two specific embodiments of the invention will now be described with reference to the drawings, in which.

Figure 1:
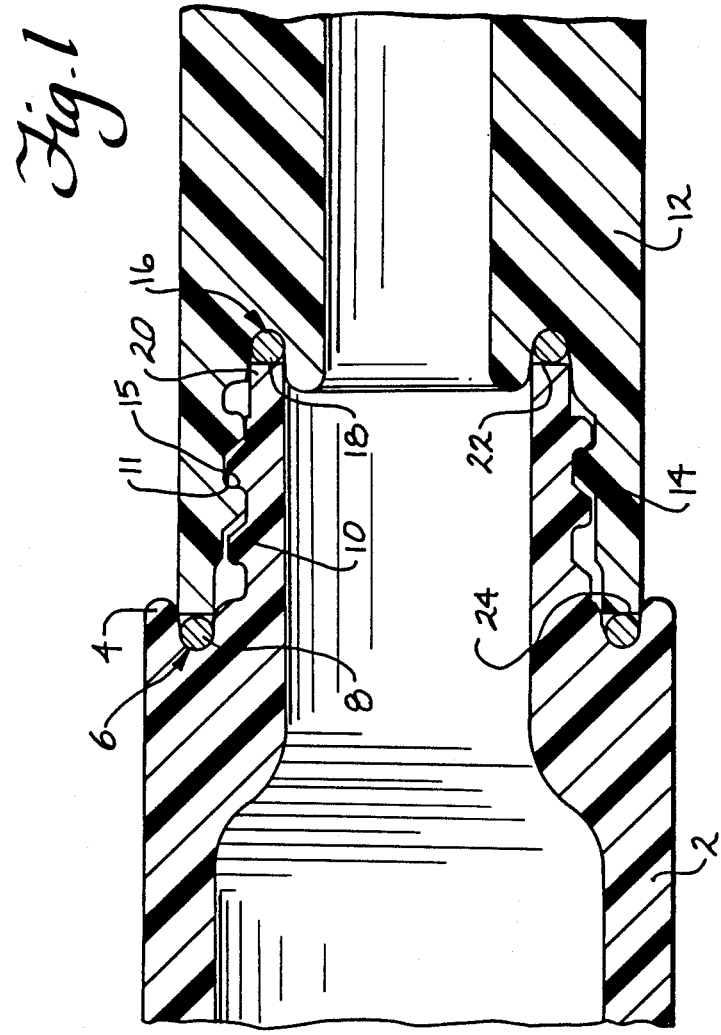
FIG. 1 is a horizontal section through two plastics pipes coupled according to the invention.

Referring first to FIG. 1, the coupling comprises a first tube (2) carrying a shoulder (4), in which is formed an annular groove (6). The groove (6) carries a sealing O ring (8). Forward of the shoulder (4), and spaced away from it, is an external thread (10) having a substantially radial mating face (11). The second element of the coupling is a tube (12), carrying an internal thread (14) having a substantially radial mating face (15) which mates with face (11) to form a constraint against relative movement tending to separate the tubes. Within tube (12) behind thread (10) is formed an annular recess or groove (16) containing an O-ring (18). The mouth (20) of tube (2) is tapered and squared off to form a sealing edge (22) which enters the groove (16) and forms a first sealing abument against the O-ring (18). At the forward end of tube (12) a similar sealing edge (24) enters groove (6), and forms a second sealing contact against O-ring (8).

The joint is assembled by screwing together tubes (2) and (12). The dimensions of the tubes are such that, on assembly, a tight seal is formed between O-ring (18) and edge (22), while edge (24) and O-ring (8) are less tightly forced together. When liquid is passed through the joint, tube (12) swells. This tends to pull edge (22) out of groove (16) and reduce the efficiency of the seal between it and O-ring (18). However, the swelling forces the edge (24) more firmly into groove (6), thereby preserving the integrity of the coupling as a whole.

The O-rings are an optional feature of the design shown in FIG. 1, and may be omitted if a sufficiently good seal is obtainable without them.

Figure 2:
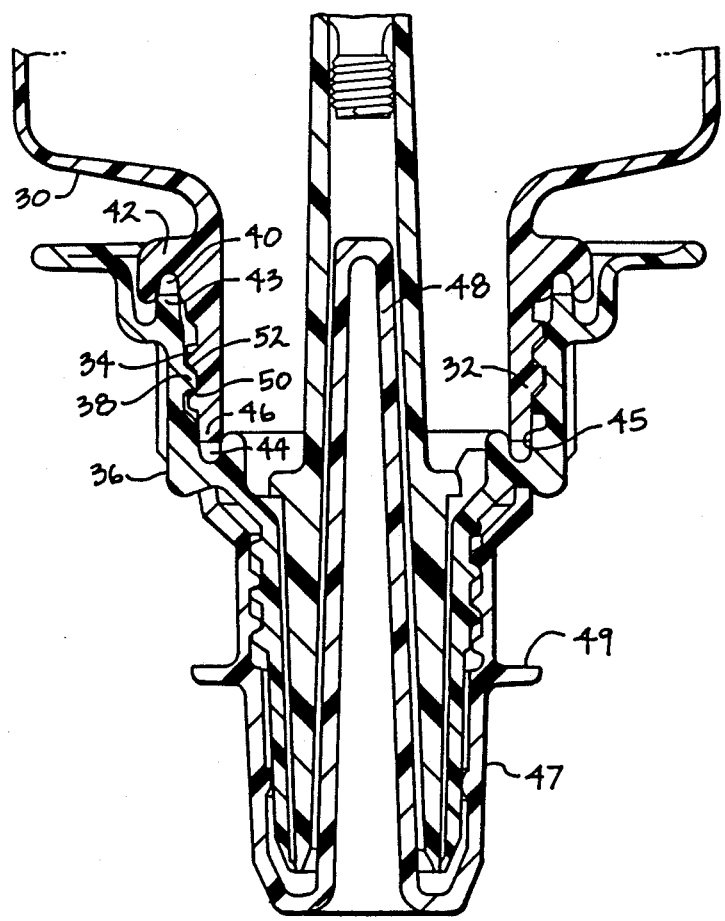
FIG. 2 is a vertical section through the neck of a plastics container carrying a plastics dispensing nozzle.

A further embodiment of the invention is illustrated in FIG. 2. This comprises a polyethlene terephthalate bottle (30) having a neck (32) carrying an external thread (34). On this neck is mounted an annular nozzle (36), by means of a corresponding internal thread (38). Nozzle (36) is designed for electrostatic spraying and is fabricated of nylon filled with carbon black to make it electrically conducting. An annular sealing groove (40) is formed in a radial projection (42) on the neck (32) of bottle (30). Into this groove (40) a squared sealing rim (43) of the nozzle (36) projects. Within nozzle (36) below thread (38) is formed a sealing well (44). This receives the squared mouth (46), the rim (45) of which is square in cross-section, of bottle (30), so as to form a tight sealing fit.

The internal thread (38) on nozzle (36) is a single start thread having a pitch of 4.25, and a length about twice the inner circumference of the nozzle (36). The lower surface (50) of the thread (38) is approximately normal to the axis while the upper surface (52) is about 30° to the horizontal and clearance is provided on the other surfaces to allow for differential movements. Nozzle (36) is closed by a screw cap (47) having an internal finger (48) to fill dead space in the nozzle. Radial flange (49) on the outside of cap (47) is provided so that cap (47) may more easily be fitted by cap loading machinery. Further details of the construction of the nozzle and bottle are as described and shown in FIGS. 7–11 of published European Patent Specification 80304204, the disclosure of which is incorporated herein by reference.

It will be apparent that differential movements may occur in the radial as well as the axial direction. Provision is made for such movements in the design of the thread profiles and in many operating environments the construction shown in FIG. 2 will be sufficiently flexible in the region of the sealing contacts (43,46) to accommodate these movements.

If desired, however, the sealing contacts may be in the form of an edge on one member contacting a radial shoulder on the other so as to permit a degree of relative radial movement in the region of the sealing contact.

The container is assembled by filling with an organic liquid pesticide formulation, and then screwing nozzle (36) onto containter (30). The relative dimensions of nozzle (36) and container (30) are such that tightening of the nozzle causes initially a strong seal between mouth (46) and well (44). However, liquid in the container causes the plastics nozzle gradually to swell to a greater extent than the bottle (30). As a consequence, the wall of nozzle (36) lengthens. It is held in contact with the bottle (30) by the threads (34,38) and movement takes place relative to the point of contact of the threads. In consequence, pressure forcing the mouth (46) into the sealing well (44) is reduced, and the seal here is weakened. This is however compensated for by the rim (43) being forced more strongly into the annular groove (40), so that overall no liquid is allowed to escape through the joint.

The container (30) and nozzle (36) are of the type shown in published European Application 803040204, referred to above. As the nozzle and bottle are intended to be permanently joined they may incorporate a set of cooperating ratchet teeth (as shown in the European Patent Specification) to prevent unscrewing. Increased permanency may also be provided by ultrasonic staking of portions of the nozzle to the container neck.

The container and nozzle are designed for electrostatic spraying of agricultural chemicals in which the nozzle is charged to a high voltage. In such processes fine tolerances in liquid passageways need to be maintained to optimise the spraying process. It is also critically important for the container and nozzle to be secure and leak proof in storage and use in view of the toxicity of many pesticides and the potential hazard to operator and the environment.

We claim:

1. A coupling comprising:
   a first tubular part;
   a second tubular part, the first and second parts being sleeved one inside the other to form a junction between the parts;
   a first sealing contact between the first and second parts, a second sealing contact between the first and second parts, the first and second contacts being spaced in an axial direction in which the first and second parts are relatively movable to effect separation thereof; and
   constraining means for constraining relative movement between the first and second parts, the constraining means including opposed substantially radial shoulders formed on respective parts, each said radial shoulder having a side face disposed in a plane which is substantially perpendicular to an axis of said first and second parts, engagement between said side faces of said shoulders constraining relative movement between the first and second parts, said constraining means being defined at a first location between the first and second contacts so that upon a differential expansion or contraction of the first and second parts, relative movement between the first and second parts in an axial direction is constrained at said first location while a relative movement between the first and second parts at other locations between said first location and the first and second sealing contacts causes one of the sealing contacts to tighten and the other sealing contact to loosen, and vice versa.

2. A coupling as claimed in claim 1 comprising flexible sealing members between at least one pair of opposed faces forming the sealing contacts.

3. A coupling as claimed in claim 1 forming part of a union between a container and a dispensing means mounted in an orifice in the container.

4. A coupling seal as claimed in claim 3 in which the dispensing means is a sprayhead.

5. A coupling as claimed in claim 4 in which the sprayhead is an electrostatic spray nozzle formed from conducting plastics material and the container is formed from insulating plastics material.

6. A coupling as claimed in claim 1 in which the container is adapted to contain liquids causing differential swelling of the materials of the container and the dispensing means.

7. A coupling as claimed in claim 5 in which the container and spray nozzle are adapted for the spraying of agricultural chemicals.

8. A coupling as recited in claim 1, wherein each of said first and second parts has a threaded surface which mates with a threaded surface of the other part, the thread profile of each said part including said respective radial shoulder having said side face, said thread profiles being otherwise shaped with sufficient play to permit a degree of relative movement.

* * * * *